United States Patent
Vincent et al.

(10) Patent No.: US 10,486,497 B2
(45) Date of Patent: Nov. 26, 2019

(54) FASTENING DEVICE FOR AN ACTUATOR AND A HOUSING, IN PARTICULAR FOR A MOTOR VEHICLE

(71) Applicant: Valeo Systemes Thermiques S.A.S., Le Mesnil Saint Denis (FR)

(72) Inventors: Philippe Vincent, Epernon (FR); Gilbert Terranova, Le Perray en Yvelines (FR)

(73) Assignee: VALEO SYSTEMES THERMIQUES, Le Mesnil St Denis (FR)

( * ) Notice: Subject to any disclaimer, the term of this patent is extended or adjusted under 35 U.S.C. 154(b) by 292 days.

(21) Appl. No.: 15/414,799

(22) Filed: Jan. 25, 2017

(65) Prior Publication Data
US 2017/0129308 A1    May 11, 2017

Related U.S. Application Data

(62) Division of application No. 14/479,891, filed on Sep. 8, 2014, now Pat. No. 9,676,252, which is a division
(Continued)

(30) Foreign Application Priority Data

Jan. 18, 2006    (FR) ...................... 06 00479

(51) Int. Cl.
*B24D 13/00*    (2006.01)
*B60H 1/24*    (2006.01)
(Continued)

(52) U.S. Cl.
CPC ........... *B60H 1/24* (2013.01); *B60H 1/00521* (2013.01); *B60H 1/00857* (2013.01);
(Continued)

(58) Field of Classification Search
USPC .......................................... 454/69
See application file for complete search history.

(56) References Cited

U.S. PATENT DOCUMENTS 4,056,043 A    11/1977    Sriramamurty et al.
4,768,545 A    9/1988    Hoffman
(Continued)

FOREIGN PATENT DOCUMENTS

EP    0 780 622 A1    6/1997
GB    2 339 715 A    2/2000

OTHER PUBLICATIONS

English language abstract and machine-assisted English translation for EP 0 780 622 extracted from espacenet.com database on Jan. 30, 2017, 9 pages.

*Primary Examiner* — Helena Kosanovic
(74) *Attorney, Agent, or Firm* — Howard & Howard Attorneys PLLC

(57) ABSTRACT

The invention proposes a device for attaching an actuator (2) to a housing (4), in particular for an automotive vehicle, the actuator being provided for driving a movable equipment (41) disposed within the housing. The device comprises attaching means for attaching the actuator on the housing. The mounting means comprise two conjugated connection flanges (20, 40), respectively mounted on a connexion face (28) of the actuator (28) and on a connection face (48) of the housing. The connexion flanges are adapted to be assembled according to a male/female type connection at the outside of the housing.

8 Claims, 15 Drawing Sheets

Related U.S. Application Data of application No. 11/654,356, filed on Jan. 17, 2007, now Pat. No. 8,888,571.

(51) Int. Cl.
*B60H 1/00* (2006.01)
*F16B 21/04* (2006.01)
*F24F 13/10* (2006.01)

(52) U.S. Cl.
CPC .............. *F16B 21/04* (2013.01); *F24F 13/10* (2013.01); *Y10T 137/6096* (2015.04); *Y10T 403/7005* (2015.01); *Y10T 403/7007* (2015.01)

(56) References Cited

U.S. PATENT DOCUMENTS

| | | |
|---|---|---|
| 5,328,152 A | 7/1994 | Castle |
| 5,954,088 A | 9/1999 | Huang |
| 6,135,137 A | 10/2000 | Engelke |
| 7,093,821 B2 | 8/2006 | Howe |
| 8,888,571 B2 | 11/2014 | Vincent et al. |
| 2004/0099833 A1 | 5/2004 | Haikawa et al. |
| 2014/0378045 A1 | 12/2014 | Vincent et al. |

FASTENING DEVICE FOR AN ACTUATOR AND A HOUSING, IN PARTICULAR FOR A MOTOR VEHICLE

RELATED APPLICATION

This application is a divisional of U.S. patent application Ser. No. 14/479,891, filed on Sep. 8, 2014, which is a divisional of U.S. patent application Ser. No. 11/654,356, filed on Jan. 17, 2007, which claims priority to French Application No. 06 00479, filed on Jan. 18, 2006, the disclosures of which are hereby incorporated by reference.

This invention relates to a fastening device for a housing and an actuator, in particular for a motor vehicle.

The actuator is used to control a movable member mounted inside the housing, e.g., a damper for an air conditioning and/or heating device (HVAC).

The actuator is generally equipped with a drive shaft that drives the movable member in rotation, after the actuator has been fastened onto the housing.

The fastening device conventionally comprises fastening means for making the actuator integral with a wall of the housing.

In known embodiments, the fastening means are of the bayonet type. Such fastening means include a connecting flange provided on the actuator and a through-opening made in the wall of the housing. The connecting flange of the actuator is sized to be inserted into the through-opening of the housing. At its free end, the connecting flange of the actuator is equipped with holding pins ensuring that the connecting flange is held axially inside the opening. The holding pins are guided in grooves provided on the interior wall of the through-opening, during insertion of the connecting flange into the through-opening. The actuator is thus fastened to the housing by bringing the flange opposite the through-opening and by then rotating the actuator until the studs pass through the opening in order to press against the interior wall of the housing.

Fastening means such, as this are described in the patent GB 23 39 715, wherein an actuator is fastened onto a housing containing a movable member of the vehicle headlight type. In this document, the actuator ensures the height adjustment of the headlights.

The above-mentioned fastening means are also used in the U.S. Pat. No. 4,768,545 for fastening an actuator onto a housing containing a movable member of the air intake valve type for an air conditioning device. In this case, the actuator makes it possible to shift the air intake valve between several positions, in particular between a position enabling air intake and a position prohibiting air intake.

However, the use of the through-opening in a housing controlled by an actuator can present numerous disadvantages.

Thus, in applications where the internal volume of the housing is the location of an airflow, e.g., in applications pertaining to heating and air conditioning devices, it is necessary for the through-opening to be perfectly closed and sealed in order to prevent air from leaking to the exterior. To accomplish this, the actuator must be equipped with sealing elements. Such being the case, the constraints of designing, producing and integrating the actuator complicate the installation of such sealing elements.

Furthermore, in embodiments wherein the actuator does not directly drive the movable member but is equipped with a lever that provides indirect drive, the lever not only interferes with the connecting flange of the actuator but also with the through-opening. In order to limit these interferences, accommodations are usually provided. However, these accommodations are particularly cumbersome and complicate molding of the housings. Moreover, they are not applicable to all vehicle heating and air conditioning devices.

The opening also has the disadvantage of creating significant bulk in the interior volume of the housing, which can impede the achievement of certain performance levels, in particular with respect to applications for vehicle heating and air conditioning devices (HVAC), wherein the movable member consists of a damper. In these applications, the presence of the through-opening therefore constitutes a constraint with regard to the location of components or shapes inside the housing, e.g., such as the location of a radiator, the location of mechanical end-of-travel stops for the damper inside the housing, or else the location of a flange for rotatably guiding the two ends of the damper inside the housing. The volume of the through-opening also limits the length of the lateral bearing surfaces of the damper, which creates sealing problems, as well as the airflow area. Interferences can also appear between the movable member and the holding pins for the connecting flange of the actuator.

The purpose of the invention is to overcome the aforesaid disadvantages by proposing a fastening device for an actuator with a housing, in particular for a motor vehicle, the actuator being designed to drive a movable member arranged inside the housing. The device comprises fastening means for making the actuator integral with the housing. According to the invention, these fastening means include two mating connecting flanges mounted, respectively, on a connecting surface of the actuator and on a connecting surface of the housing, while the connecting flanges are capable of being assembled via a male/female-type connection on the exterior of said housing.

The fastening device of the invention thus offers a sturdy mechanical connection between the housing and the actuator, on the exterior of the housing, which guarantees a proper seal and does not create any problem of bulk within the interior volume of the housing.

Optional and/or replacement features of the fastening device of the invention are stated below:

A support is placed between the actuator and the housing and comprises a connecting surface on which the connecting flange is mounted.

The connecting flanges are shaped so that the actuator is connected to the housing, by a translational movement in the direction of the drive shaft, or to the support, followed by a rotational movement until a predefined stopping position is reached.

The connecting flanges are shaped so as to cause a translation movement toward the housing when there is a rotational movement of the actuator.

The connecting flanges have mating helical connecting shapes on at least a portion of their wall, and the connecting shapes of the male flange include discontinuous helical grooves.

The connection between the flanges is of the bayonet type.

The fastening means further include a stop device designed to block the rotation of the actuator in relation to the housing or support, in the stop position.

The stop device includes a latching tab arranged on the actuator and a holding mechanism arranged on the connecting surface of the housing or support, the tab being designed to be fastened to the holding mechanism by clipping on, when the actuator reaches its stop position.

The holding mechanism comprises a guide element and holding elements, the guide element being shaped so as to bring the latching tab substantially opposite the holding element during the rotating movement of the actuator, and the holding elements being shaped so as to connect by clipping together with the latching tab when the actuator reaches its stop position.

The latching tab comprises an elastic portion, while the guide element is shaped so as to exert increasing stress on the latching tab during the rotating movement of the actuator, the elastic portion of the latching tab relaxing when the tab arrives substantially opposite the holding elements.

The guide element describes an arc of circle that is off-center in relation to the axis of rotation of the actuator.

The latching tab extends in an overall plane that is substantially parallel to the connecting surface on which it is arranged.

The latching tab extends in an overall plane that is substantially perpendicular to the connecting surface on which it is arranged.

The stop device includes a holding stud arranged on the housing or support, while the actuator is designed to be screwed onto the holding stud, after assembly of the actuator and housing.

The fastening device further comprises a foolproof device so as to allow electrical connection of the actuator only when its rotation in relation to the housing is blocked by the stop device.

The fastening device further includes a locator comprising three sub-locators placed so as to form an arc of circle, the center of this arc of circle being located by the axis of rotation D of the flange of the actuator, this arc of circle arrangement limiting the placement of the actuator to a single position in relation to the housing or support.

The device further comprises at least one first stabilizing means located between one side of the actuator and a first sub-locator, this first stabilizing means holding the latching tab of the actuator pressed against one of the clipping walls forming the holding means.

The first stabilizing means is integral with the actuator or with the first sub-locator.

The device further comprises at least one second stabilizing means located between the connecting surface of the actuator and the connecting surface of the housing or support, this second stabilizing means holding in contact at least two mating helical connecting shapes.

The second stabilizing means is integral with the actuator or the connecting surface.

The fastening means further include two substantially L-shaped axial holding pins arranged, respectively, on the connecting surface of the housing or the support and on the connecting surface of the actuator, the L-shape of each pin having a first branch extending substantially perpendicular to the corresponding connecting surface and a second branch substantially parallel to the corresponding connecting surface, while the second branch of the pin of the housing is shaped so as to press against the second branch of the pin of the actuator, towards the interior of the housing, when the actuator reaches its stop position.

The connecting flange of the actuator is shaped so as to obstruct at least one opening in the connecting surface supporting the mating flange, the opening being arranged on the interior or exterior periphery of said mating flange.

The connecting flange of the actuator includes helical connecting shapes on both an interior surface and an exterior surface of said wall or on one of these surfaces of its wall.

The movable member has a connecting bearing and the actuator has a drive shaft, the connecting bearing being shaped so as to be connected to the drive shaft of the actuator during fastening of the connecting flanges.

The drive shaft of the actuator and the connecting bearing of the movable member are coaxial in relation to the axis of the connecting flanges.

The drive shaft of the actuator and the connecting bearing of the movable member are off-center in relation to the axis of the connecting flanges.

The bearing has a notch shaped so that the drive shaft of the actuator comes to nest radially inside the bearing via the notch, when the actuator reaches its stop position.

The drive shaft of the actuator has a notched shaped so as to nest radially inside the connecting bearing of the movable member, via the notch, when the actuator reaches its stop position.

The bearing of the movable member is off-center in relation to the drive shaft of the actuator, while the drive shaft of the actuator is connected to the bearing of the movable member via an indirect drive mechanism.

The indirect drive mechanism includes a connecting rod hinged to the drive shaft of the actuator via a first lever and to the bearing of the movable member via a second lever, while the connecting flanges of the actuator and the housing or support each have a notch on their wall, which is shaped so as to allow the first lever to pass through the flanges.

The lever is shaped so as to obstruct at least one opening made along the periphery and on the inside of the connecting flange located on the connecting surface of the housing or support.

The actuator has a double-ended drive shaft whose first end is located on the same side as the connecting flange, and whose second end is located on the side opposite this connecting flange, in relation to the body of the actuator.

The ends of the drive shaft can be either of the male or female type.

A drive shaft of the actuator drives both at least one indirect drive mechanism and/or one movable member.

The indirect drive mechanism comprises a connecting means so as to connect said indirect drive mechanism to the drive shaft of the actuator or to the connecting bearing of the movable member or to another indirect drive mechanism.

The female connecting flange has at least one local slot on its wall.

The invention further proposes a heating and air conditioning system comprising an airflow housing in which a damper is housed, the damper being driven by an actuator. The system advantageously comprises a fastening device as defined above, for making the actuator integral with the housing.

Other features and advantages of the invention will become apparent upon studying the following detailed description and from the appended drawings in which.

Figure 1A:
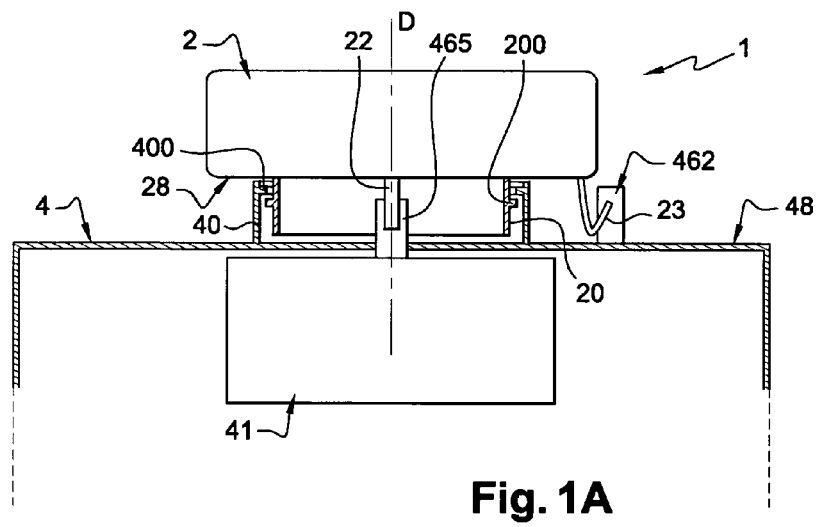
FIG. 1A is a diagram showing a housing/actuator assembly equipped with the fastening device of the invention.

FIG. 1A is a diagrammatic view of a housing/actuator assembly including a fastening device for making an actuator 2 integral with a housing 4, according to the invention. The assembly 1 includes a housing 4 equipped with walls that define an interior volume in which a movable member is housed. The movable member has a spindle designed to be driven by an external actuator 2.

Here, and throughout the remainder of the description, the terms "interior," "exterior" or "external" are used in reference to the walls of the housing. In particular, the so-called "interior" elements are arranged on the side of the housing wall where the movable member 41 is housed, while the so-called "external" or "exterior" elements are arranged on the other side of the wall.

The actuator 2 consists of a drive motor equipped with a drive shaft 22, running along an axis D. The drive shaft can engage directly or indirectly with the spindle of the movable member 41.

The assembly 1 of the invention can comprise any type of actuator, e.g., an electric or pneumatic actuator.

In particular, it is advantageous to use the fastening device of the invention in a vehicle, and more particularly for a vehicle heating and air conditioning device (HVAC). For example, it is possible to use the fastening device of the invention in order to channel or distribute air into the passenger compartment of the vehicle. For example, the housing 4 can be an air inlet box of the HVAC device, which is connected to an air inlet and to an air outlet. The air outlet delivers an airflow to a pulser placed upstream from a heat exchanger, e.g., an evaporator. The movable element 41 is then an air intake valve that is interposed inside the housing in order to regulate the airflow rate towards the evaporator. The valve 41 is rotated between various positions enabling the intake of external air, or of re-circulated and filtered air coming from the passenger compartment, or else a mixture of the two. The actuator 2 regulates the rotation of the air intake valve 41 between these positions. However, the invention is not limited to air intake housings containing an air intake valve of an HVAC device. It also applies to any damper of the HVAC device that is housed inside an air circulation housing.

In the remainder of the description, reference will be made, for non-limiting illustrative purposes, to a movable member 41 of the damper type for an HVAC device.

The invention proposes external fastening means for making the actuator 2 integral with the box 4, guaranteeing both a radial and axial hold of the actuator 2 after assembly, as well as the connection between the drive shaft 22 of the actuator 2 and the spindle of the movable member 41.

As shown in FIG. 1A, the fastening means include a connecting flange 20 arranged on a connecting surface 28 of the actuator 2 and a connecting flange 40 arranged on the connecting surface 48 of the housing 4. The connecting flange 40 of the housing 4 extends outward from the housing and has a shape that mates with the connecting flange 20 of the actuator.

The connecting flanges 20 and 40 are shaped so as to be assembled together via a male/female-type connection on the exterior of the housing.

Thus, it is no longer necessary to provide a large-diameter through-opening in the wall of the housing. The wall of the housing has nothing more than a very small-diameter opening to enable the connection between the drive shaft 22 of the actuator and the spindle of the movable member 41. The exterior seal of the housing is ensured by the damper bearing. Thus, the fastening device of the invention does not have the sealing problems encountered in the prior art, with respect to the connection between the housing and the actuator.

Furthermore, since the connection between the actuator 2 and the housing 4 is made on the exterior of the housing, the use of the interior volume of the housing is determined only by the shape of the movable member 41. It is thus possible to incorporate mechanical stops very close to the axis of the housing, in order to require the damper to stop rotating.

Figure 2:
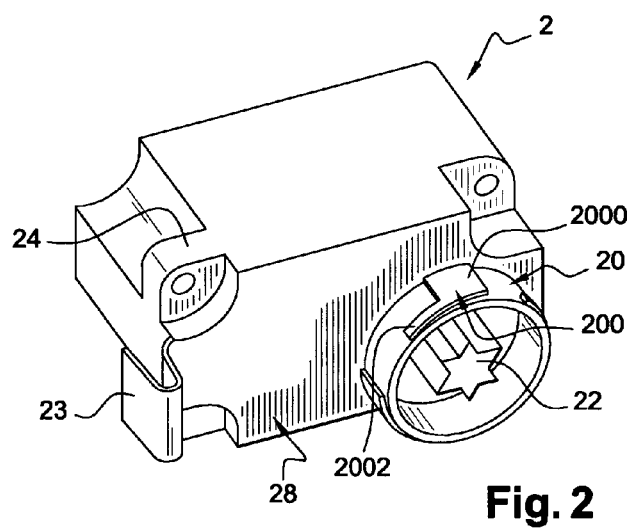
FIG. 2 is a perspective view of the actuator showing its connecting surface.
Figure 3:
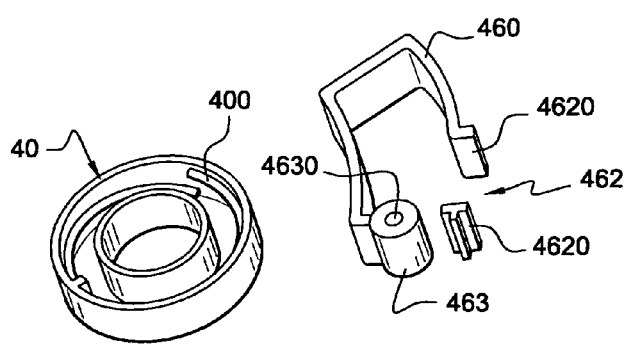
FIG. 3 is a perspective view of the fastening means provided on the housing.

Reference is now made to FIGS. 2 and 3, which show various steps of the actuator 2 and housing 4 being assembled together.

Figure 4:
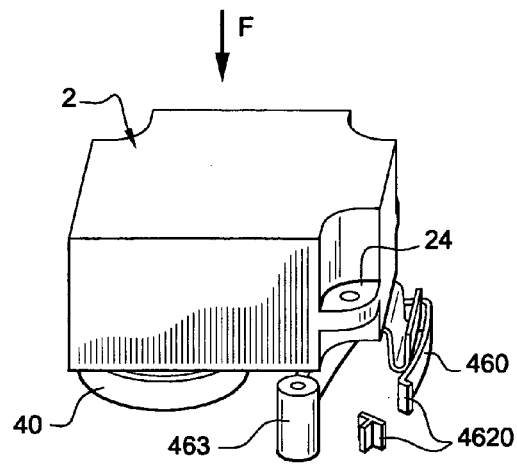
FIG. 4 is a partial perspective view of the housing/actuator assembly in a first assembly step.

The connecting flanges 20 and 40 are shaped so that the actuator is connected to the housing 4 first via a translational movement shown in FIG. 4, in the direction of the drive shaft 22 of the actuator and towards the interior of the housing (Arrow F), then via a rotational movement, until a predefined stop position is reached, as shown in FIG. 3.

The translational movement along the arrow F is imparted on the actuator in order to place the male flange in contact with the female flange. Furthermore, in this initial assembly step, the drive shaft engages with the bearing 465 of the movable member 41.

During the rotational movement imparted on the actuator, the male connecting flange gradually moves into the female connecting flanges until the actuator 2 reaches its stop position. The connecting flanges are then nested and locked together axially.

The fastening means thereby cooperate in order to transform the rotational movement of the actuator 2 into a translational movement towards the housing, at the end of which the flanges are engaged. The connecting flanges 20, 40 are thus shaped so as to produce a translational movement towards the housing 4 during the rotational movement of the actuator 2. The connection between the flanges 20 and 40 is so that they ensure that the actuator 2 is held axially in relation to the housing 4, after assembly.

Figure 1B:
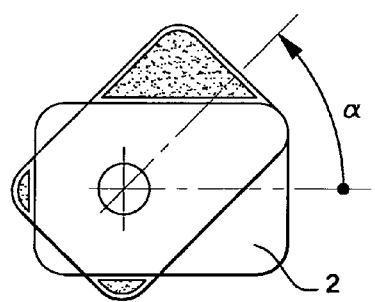
FIG. 1B is a diagram showing the rotational movement imparted on the actuator during the assembly phase.

The invention makes it possible to define a rather small angle of rotation a for assembling the actuator 2 to the housing 4, which is more particularly advantageous in the applications for HVAC devices. As a matter of fact, in the HVAC applications, the air housings generally support a rather large number of actuators on the same surface and, as a result, the free space around a given actuator is rather small. Generally speaking, the invention is more particularly suited to applications where the connecting surface 48 of the housing is cluttered, e.g., by the use of numerous actuators or reinforcing grooves. The stop position of the actuator 2 can in particular be defined so that the actuator substantially describes an angle α of 15° to 16°, as shown in FIG. 1B. In FIG. 1B, the actuator is shown in its initial position before rotating (unshaded shape) and in its stop position after rotating (shaded shape).

The connecting flanges 20 and 40 have mating helical connecting shapes 200 and 400 on at least one portion of their external wall. The helical connecting shapes of the male flange 20 are, in particular, in the form of discontinuous helical grooves.

The mating helical shapes provided on the male flange 20 and on the female flange 40 are shaped so as to come into contact with each other during the initial assembly phase of FIG. 4, and so as to guide the rotational movement of the actuator 2 in relation to the housing, until the stop position is reached. In the stop position, the male flange is nested inside the female flange and held axially therein. The flanges 20 and 40 thus guarantee that the actuator 2 is held axially in relation to the housing 4.

It is particularly advantageous to provide the female portion on the housing 4 and the male portion on the actuator 2 in order to enable the surface of the flange 40 to be extracted from the housing by means of a pin driven in rotation and translation, which is positioned in the direction of extraction from the housing, as well as the extraction of the flange surface 20 from the actuator, by means of a pin driven in rotation and translation, which is small in size and compact in design.

Thus, the following description will be made, for non-limiting illustrative purposes, with reference to the fastening means comprising a female flange 40 on the housing 4 and a male flange 20 on the actuator.

In one particular embodiment, the connection between the flange of the actuator 20 and the flange of the housing can be a screw/nut-type of connection.

In this embodiment, as shown in FIGS. 2 and 3, the male flange has a male screw thread consisting of protruding helical shapes on at least a portion of its external wall, while the female flange has a female screw thread mating with that of the male flange, on at least a portion of its internal wall.

As indicated above, the screw thread of the male flange 20 can consist of discontinuous helical grooves on at least a portion of its external wall. Thus, for example, in FIG. 2, the male flange 20 has three helical grooves 200 radially distant from one another by approximately 120°. Each helical groove consists of a protruding shape including a substantially rectangular portion 2000 starting from the base of the flange surmounted by an arm 2002 extending radially from and passing beyond one side of the rectangular base. The arm 2002 is also slightly inclined towards the free end of the flange 20. The tilt of the arm 2002 of the male flange 20 makes it possible to move the actuator 2 closer to the housing 4 during the rotating phase of the actuator.

On its internal wall, the female flange has a female screw thread mating with that of the male flange, shaped so as to enable the male flange to be inserted into the female flange via a rotational movement of the actuator, at an angle α, and to axially hold the male flange inside the female flange, after insertion. The female screw thread in particular is discontinuous and arranged on at least a portion of the internal wall of the female flange 40.

The fastening of the flanges 20 and 40 via a screw/nut-type connection is particularly advantageous for the production of housing molds. However, the invention is not limited to this type of connection between the flanges.

As an alternative, the connecting flanges 20, 40 can be shaped so as to be fastened together via a bayonet-type connection. The external wall of the male flange and the internal wall of the female flange then comprise substantially parallel connecting shapes ensuring the axial hold of the connection.

Figure 15:
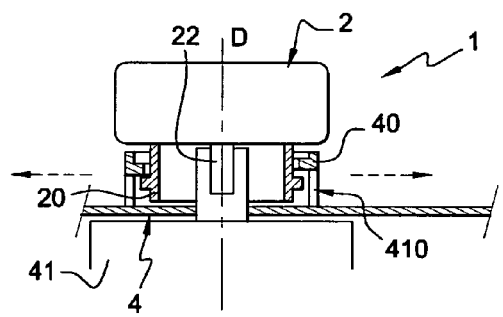
FIG. 15 is a diagram of an embodiment of the fastening device of the invention in which slots are provided on the female flange.

In this alternative embodiment, local slots 410, shown in FIG. 15, can be provided in the female flange 40 to enable extraction of the fastening shapes with the aid of slides driven in translation. It is then not necessary to use a rotary/transfer mold.

The remainder of the description will refer, for non-limiting illustrative purposes, to a screw/nut-type of connection.

Once again reference is made to FIG. 1A. During fastening of the connecting flanges 20 and 40, the male flange 20 is nested inside the female flange 40. The respective axes of the flanges 20 and 40 are then coincident, as shown by the fastening axis D.

The connecting surface 48 of the housing has a bearing 465 connected to the movable member 41. The drive shaft 22 of the actuator engages with the bearing 465 of the movable member 41 along a drive link axis D2.

The fastening axis D of the flanges can be coaxial with the drive link axis D2, as shown in FIG. 1A. The flange 20 of the actuator then has an axis that coincides with the axis of the drive shaft 22. The flange 40 of the housing 4 has an axis that is coaxial with the axis of the bearing 465 of the movable member 41. The drive shaft 22 is thus surrounded by the flange 20 of the actuator and the bearing 465 is surrounded by the flange 40 of the housing.

The connection between the drive shaft 22 of the actuator 2 and the bearing 465 of the damper 41 thus occurs substantially where the actuator 2 is fastened to the housing 4.

When the movable member 41 has an axis of rotation that is coaxial with the axis of the bearing 465, the latter is then coaxial with the axis D of the flanges. In this configuration, the rotational movement imparted on the actuator, shown in FIG. 3, is made about the axis of rotation of the movable member 41. An embodiment such as this guarantees a very precise adjustment of the drive shaft of the actuator in relation to the axis of rotation of the damper 41, while at the same time ensuring precise alignment of the drive shaft 22 in relation to the damper 41.

In the initial assembly phase, shown in FIG. 2, the drive shaft 22 nests inside the bearing 465 of the damper 41, via cooperating shapes, e.g., "star" shapes, substantially simultaneously with the nesting together of the flanges.

As an alternative, it is possible to locate the drive link axis D2 separately and at a distance from the fastening axis D of the flanges. The axis D2 and the axis D are then off-center.

Figure 6:
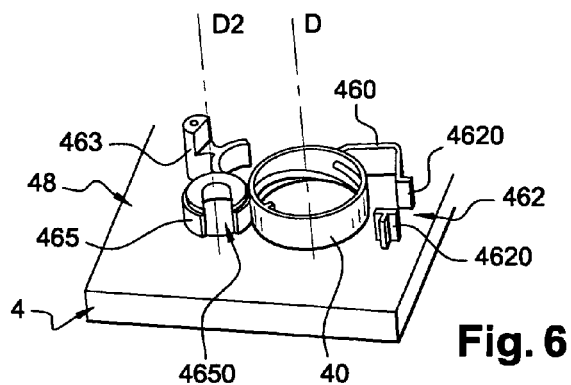
FIG. 6 is a perspective view of the fastening means arranged on the housing when the drive shaft of the actuator and the drive pin of the movable member are off-center in relation to the axis of the flanges.
Figure 7:
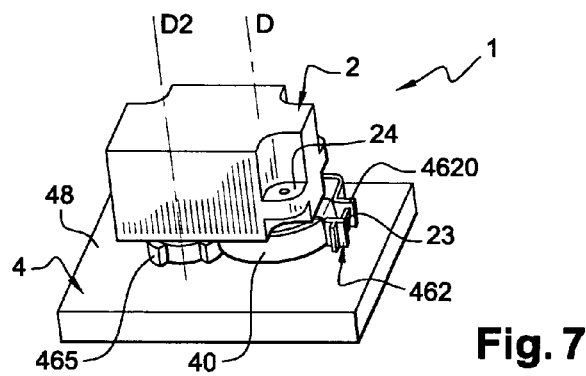
FIG. 7 is a perspective view of the housing-actuator assembly in the embodiment of FIG. 6.
Figure 8:
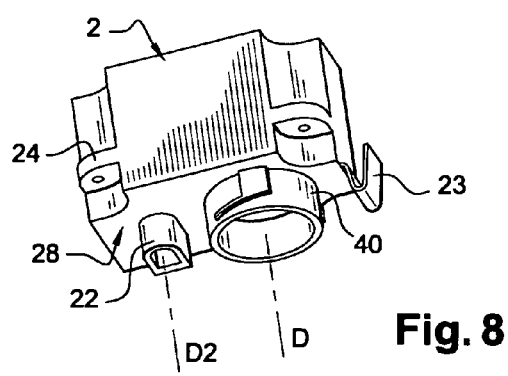
FIG. 8 is a perspective view of the fastening means arranged on the actuator, in the embodiment of FIG. 6.

This alternative embodiment is shown in FIGS. 6 to 8, which show a partial top view of the housing, a perspective view of the housing/actuator fastening assembly, and a perspective view of the actuator 2, respectively.

More precisely, as shown in FIG. 7, the drive link axis, along the axis D2 between the drive shaft 22 and the bearing 465, is separate from the fastening axis D between the flanges 20 and 40, and off-center in relation thereto.

Thus, the axis D of the flange 40 of the housing 4 is distant from the axis D2 of the bearing 465 of the damper, as shown in greater detail in FIG. 6.

In the same way, the axis D of the flange 20 of the actuator 2 is distant from the drive shaft 22, as shown in FIG. 8.

In this alternative embodiment, the bearing 465, shown in FIG. 6, has a shape designed to receive the drive shaft 22 of the actuator via radial nesting, and not axial as in the embodiment where the axes D and D2 are coaxial. The connection between the drive shaft 22 and the bearing 465 of the damper is made via radial nesting, when the actuator 2 reaches its stop position, at the end of the rotational movement. The bearing 465 has a notch 4650, at the front, in relation to the rotating direction of the actuator, in order to enable radial nesting. The drive shaft 22 passes into the bearing via this notch 4650, substantially at the end of the rotational movement, in order to engage with the movable member 41.

The fastening means of the invention further comprise a stop device making it possible to block the rotation of the actuator after assembly.

As shown in FIGS. 2 and 3, this stop device comprises a latching tab 23, arranged on the connecting surface 28 of the actuator 2. In particular, the tab 23 can have an elastic portion. The stop device also comprises holding elements 462 arranged on the connecting surface 48 of the housing, in conjunction with the latching tab 23.

Figure 5:
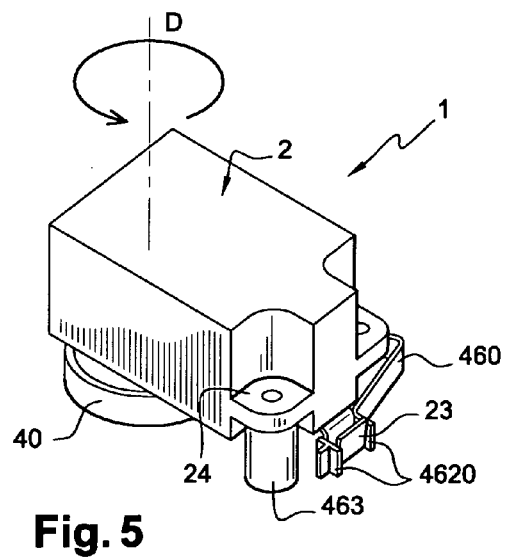
FIG. 5 is a partial perspective view of the housing/actuator assembly in a final assembly step.

As shown in FIG. 5, the latching tab is designed to be clipped onto the holding elements 462 when the actuator 2 reaches its stop position.

The holding elements 462 can consist of two clipping walls 4620 of low height, perpendicular to the connecting surface 48 of the housing and to the overall plane of the latching tab. The clipping walls 4620 are spaced apart from each other so as to hold the latching tab when it is clipped between them.

The shape of the screw thread 200 of the male flange 20, shown in detail in FIG. 2, and in particular the tilt of the arm 2002, is designed to lower the latching tab 23 into its stop, defined by the holding elements 462, at the end of the rotating phase.

The latching tab 23, in particular, is folded over, as shown in particular in FIG. 1A. It can extend in an overall plane perpendicular to the connecting surface 28 of the actuator 2.

The latching tab, for example, is folded over substantially at 18°, so as to define two parallel surfaces, the tab 23 then being fastened to the actuator on one of its ends, while its other end is free.

Figure 12:
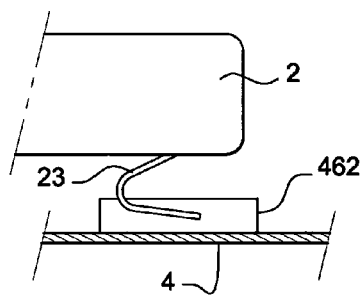
FIG. 12 is a partial diagram of the housing/actuator assembly showing an alternative embodiment of the latching tab of the actuator.

As an alternative, as shown in FIG. 12, the latching tab can extend in an overall plane parallel to the connecting surface 28 of the actuator.

The shape and location of the latching tab 23 and holding elements 462 are not limited to those described above for non-limiting illustrative purposes. In particular, the elastic tab 23 can form any angle with the connecting surface 28 of the actuator. In addition, as an alternative, the latching tab 23 can be arranged on the connecting surface 28 of the housing while the holding elements are arranged on the connecting surface 28 of the actuator 2.

Additionally, the stop device comprises a guide element 460 describing a curve designed to guide the latching tab towards the holding elements 462, during the rotational movement of the actuator.

When the actuator 2 is initially inserted into the flange 40 of the housing 2, the latching tab comes into contact with the guide element 460. Next, during the rotational movement imparted on the actuator, the latching tab 23 is guided towards the holding elements 262 in order to be clipped therein.

In the embodiments wherein the latching tab 23 comprises an elastic portion, the guide element 460 can be shaped so as to exert increasing prestress on the latching tab 23, until the latching tab arrives at the holding elements 462. In this position, the latching tab 23 and the guide element are no longer in contact: the tab 23 then relaxes so as to clip onto the holding elements 462.

The guide element 460 can have the shape of an arc of circle, off-center in relation to the axis of rotation of the actuator 2, in order to be able to exert prestress on its elastic portion during rotation of the actuator. It can also have a guide groove in order to enable guiding of the latching tab. Thus, when the actuator 2 is inserted axially, the latching tab 23 enters the groove of the guide element 460 without being forced. During the rotating phase of the actuator, the elastic portion of the tab 23 then undergoes increasing prestress due to the shape of the guide element 460. The tab exits the guide groove when it arrives at the holding elements 462: its elastic portion then relaxes, which enables it to be clipped onto the holding elements 462.

One of the holding walls 4620 in particular can be formed at one end of the guide element 460 with a recessed wall, as shown in the figures.

The stop device thus made then forms a stop that impedes a screw rotation opposite the one used for assembling the actuator 2 onto the housing 4. This stop device blocks the actuator in rotation, and thereby ensures the radial hold of the actuator 4 in relation to the housing 2.

Figure 13:
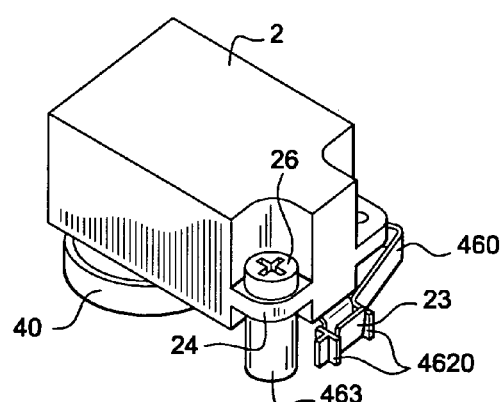
FIG. 13 is a perspective diagram of the housing/actuator assembly showing the use of a screw connection between the actuator and the housing.
Figure 14:
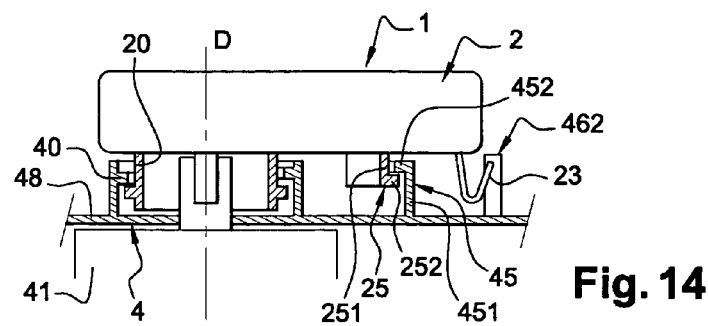
FIG. 14 is a partial diagram of the housing/actuator assembly showing the use of axial holding pins.

The stop device can further comprise a screw connection at the location where the actuator 2 is screwed onto the housing 4, as shown in FIG. 13. The stop device then comprises a stud 463 arranged on the connecting surface 48 of the housing. The stud 463 has an axis that is substantially perpendicular to the connecting surface 48 of the housing and a screw opening 4630. The stud is shown in detail in FIG. 3.

The actuator 2 is screwed onto the stud 463 through the opening 4630. A connecting area 24 equipped with a through-opening can be provided on the actuator in order to be connected to the stud 23. The area 24 and the stud 23 are screwed together by means of a screw 26, shown in FIG. 13.

This screw connection can be used alone or in combination with the latching tab 23 in order to exercise a radial hold. Used alone, it ensures the radial hold of the actuator in relation to the housing. Used in conjunction with the latching tab, it reinforces the connection between the actuator and the housing, and secures it, or replaces it in the event of damage.

The fastening means can further comprise mating axial holding pins 25 and 45 arranged on the actuator 2 and on the housing 4, respectively.

Each holding pin 25 or 45 is arranged on the corresponding connecting surface 28 or 48 and is substantially L-shaped. A first branch 250 or 450 of the L-shape of each pin 25 or 45 is substantially perpendicular to the corresponding connecting surface 28 or 48 of the actuator 2 or the housing 4, and the second branch 252 or 452 of the L-shape is substantially parallel to the corresponding connecting surface 28 or 48.

The pin 25 of the actuator 2, in particular, is arranged between the flange 20 and the tab 23.

The holding pins 25 and 45 are arranged so that the second branch 452 of the pin 45 of the housing presses against the second branch 252 of the pin 25 of the actuator, in the direction of the housing, when the actuator is in its stop position. The holding pins 25 and 45 hold the actuator in order to prevent it from being positioned at an angle, e.g., when it is in the stop position. In this way, they make it possible to further secure the axial hold.

As described above, the movable member 41 can be driven directly by the drive shaft 22 of the actuator 2. In this case, the drive shaft 22 of the actuator and the axis of rotation of the movable member 41 are coaxial.

As an alternative, the invention is customized for an indirect driving of the movable member 41, by means of an appropriate drive link mechanism. The actuator 2 is then off-center on the housing 4 in relation to the axis of rotation of the movable member 41.

Figure 9:
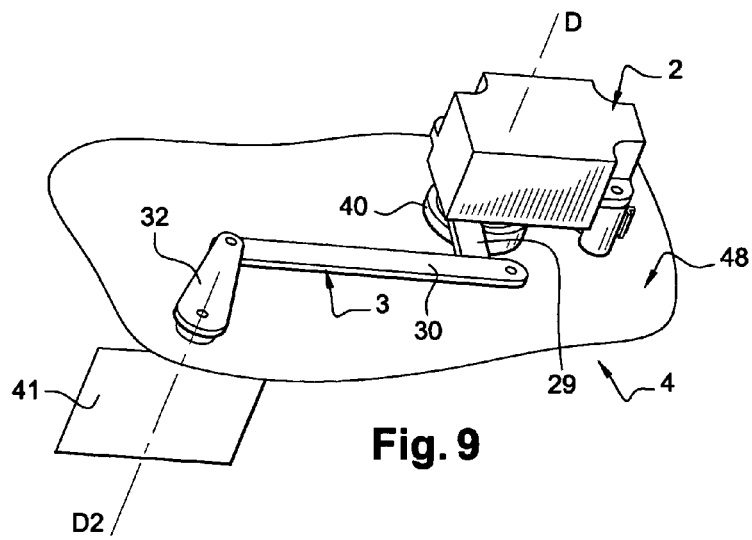
FIG. 9 is a partial perspective view of the housing/actuator assembly in an embodiment wherein the drive shaft of the actuator is connected to the drive pin of the movable member via an indirect drive mechanism.
Figure 10:
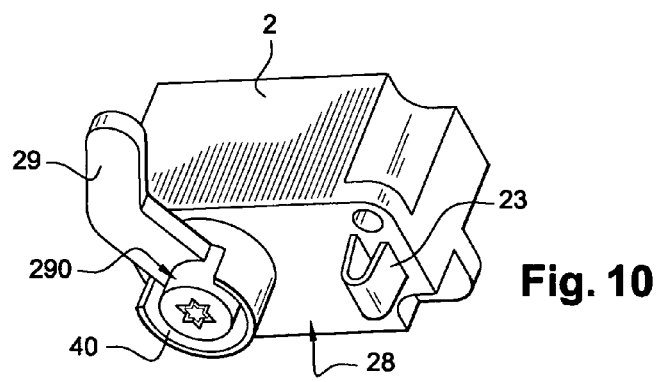
FIGS. 10 and 11 are respective perspective views of the actuator and fastening means arranged on the housing, in the embodiment of FIG. 9.
Figure 11:
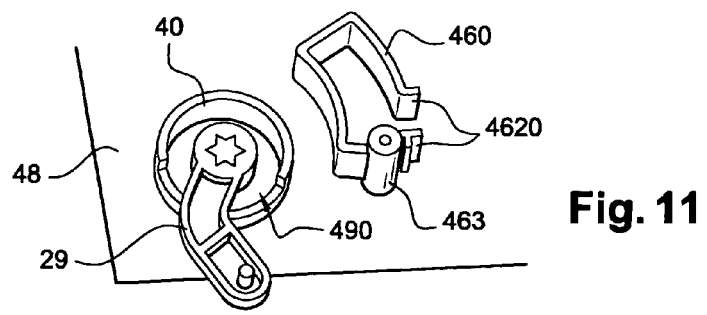

FIGS. 9 to 11 show an example of the movable member 41 being driven indirectly via the actuator 2.

In the embodiment shown in these figures, the drive link mechanism 3 between the actuator and the movable member consists of a connecting rod 30, a first lever 29 on the actuator side and a second lever 32 on the movable member side.

FIG. 9 shows the drive mechanism 3 in its entirety, arranged on the exterior of the housing 4. The first lever 29 is connected to the actuator while the second lever 32 is connected to the bearing 465 of the movable member 41, the first lever and the second lever both being connected to the connecting rod 30.

In this embodiment, the drive shaft 22 is coaxial with the axis D of the flange 20 while the axis D2 of the bearing 465 is arranged at a distance from the axis D. The axis of the bearing coincides with the axis of rotation of the movable member 41, which, in this case, is a damper.

FIGS. 10 and 11 are respective views of the actuator 2 and of the connecting surface 48 of the housing 4, in this embodiment. The flanges 20 and 40 each have a notch 290 and 490 to enable travel of the first lever 29. The first lever 29 can be rotatably connected to the shaft 22 of the actuator 2 or translatably mounted thereon, e.g., via a star-shaped link. The lever 29 passes through the notch 290 provided in the wall of the flange 20.

The flange 40 of the housing 4 also has a notch 490 in order to allow the first lever 29 to pass by, after assembly of the flanges.

In this direct drive embodiment, the drive shaft 22 and the axis of the flanges 20 and 40 can be coaxial or distant from each other.

The invention is not limited to this type of drive link mechanism for indirect driving of the movable member. The drive link mechanism, for example, can be made by placing two pinions in contact with each other near the notch in the flanges.

The helical shapes of the flanges are arranged on the unnotched portion of the flange walls. Although this notched shape of the flanges is particularly suitable in the case of indirect driving of the movable member 41, it also applies to the direct drive embodiments.

Figure 16:
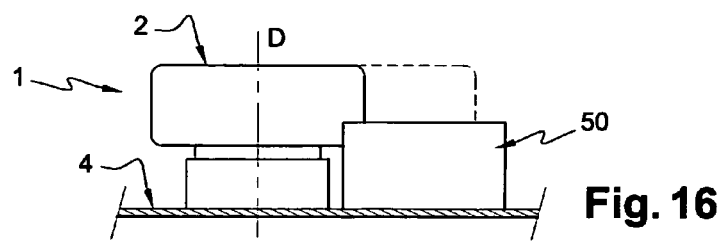
FIG. 16 is a diagram of an embodiment of the fastening device of the invention with a foolproof safety device.

The invention further makes it possible to incorporate a foolproof assembly device making it possible to prohibit the electrical connection of the actuator if the latter has not reached its stop position, as shown in FIG. 16. This makes it possible to guarantee that the latching tab 23 is indeed clipped onto the holding elements 462, before plugging in the electrical plug of the actuator.

The foolproof device is thus arranged so as to allow the electrical connection of the actuator only when the rotation of the actuator in relation to the housing is blocked by the stop device. The dotted line shape represents the actuator in its stop position.

In particular, the foolproof device includes an element 50 positioned so that the actuator is electrically connected only if the latching tab 23 is indeed engaged with the holding elements 462, which guarantees that the actuator is in its stop position.

Figure 17:
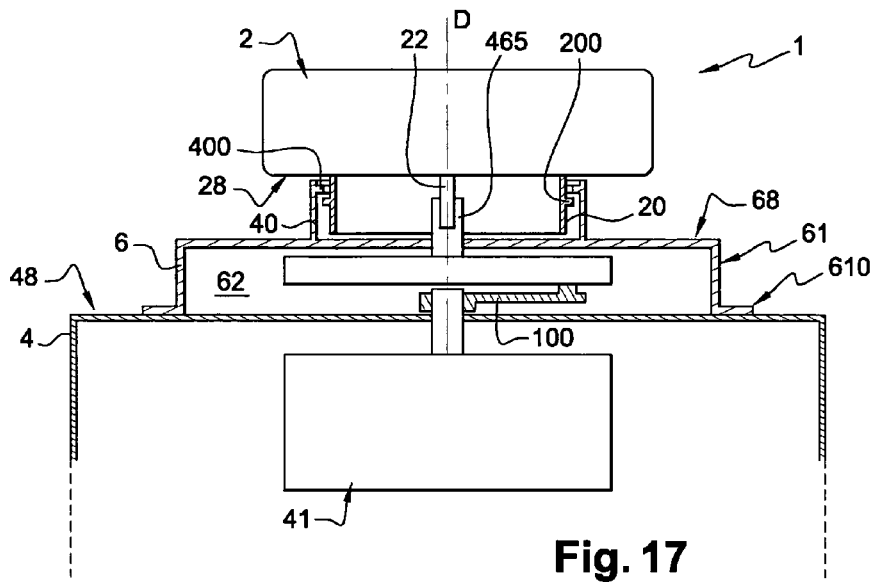
FIG. 17 is a diagram illustrating a support mounted between the housing and the actuator.

According to another embodiment shown in FIG. 17, the housing 4 can comprise a support 6 on its connecting surface 48. The support 6 is placed between the actuator 2 and the housing 4 and comprises a connecting surface 68 on which the connecting flange 40 is mounted. This support 6 consists of an intermediate plate including a connecting surface 68 on which the actuator 2 is mounted. At each of its ends, the connecting surface 68 comprises an L-shaped peripheral edge 61. In this way, the support has an overall U-shape. The free end 610 of the peripheral edge 61 is mounted on the connecting surface 48 of the housing 4. The support 6 includes the connecting flange 40 cooperating with the connecting flange 20 of the actuator 2. The connecting flange 20 and the connecting flange 40 mate and are capable of being assembled via a male/female-type connection on the exterior of the housing 4. This support makes it possible to form a cavity 62 between the external face of the connecting surface 48 of the housing 4 and the side of the connecting surface 68 of the support 6 opposite the connecting surface 48 of the housing 4. Thus, this cavity 62 makes it possible to house link mechanisms 100, such as a drive link mechanism, connecting the actuator 2 to the movable member 41. Generally speaking, the support 6 is an element separate from the housing 4. The connecting surface 68 of the support 6 can replace the connecting surface 48 of the housing 4, i.e., all the elements situated on the connecting surface 48 of the housing 4, as described in FIGS. 1 to 16, can be situated on the connecting surface 68 of the support 6 when the latter is used. For this reason, all the elements supported on the connecting surface 48 of the housing 4 can be supported by the connecting surface 68 of the support 6. All of the embodiments described previously and hereinafter can include either the connecting surface 48 of the housing 4 or the connecting surface 68 of the support 6. This support is primarily used when the actuator 2 must control several movable members 41, the latter being uncoupled from each other. In other words, the support 6 is used when several movable members 41 follow a kinematic distribution law controlled by a single actuator 2.

Figure 18:
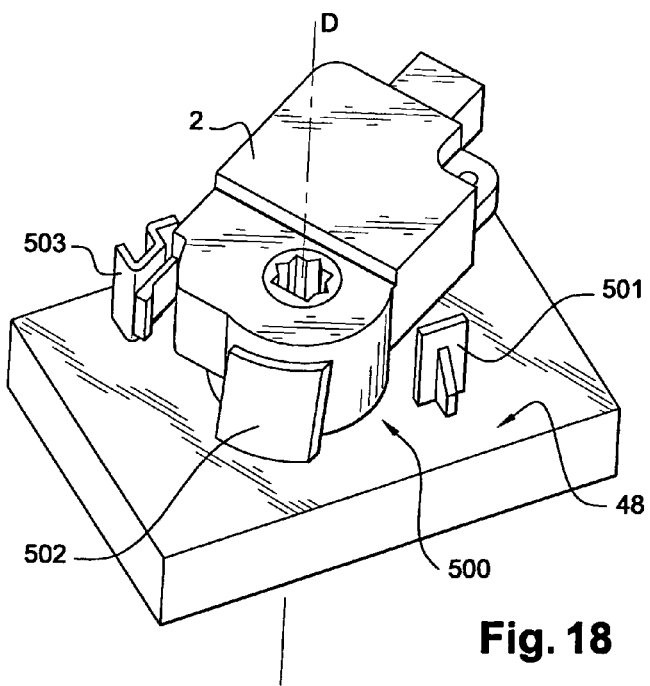
FIG. 18 is a diagram showing a locator.

According to an alternative of the invention, shown in FIG. 18, the fastening device 1 further includes a locator 500 prohibiting any irregular insertion of the actuator 2 on the connecting surface 48 of the housing 4. The function of this locator 500 is to prevent the actuator 2 from being positioned poorly when the actuator 2 is mounted on the connecting surface 48 of the housing 4, i.e., during the translational movement of the actuator towards the housing 4. This locator 500 thereby enables the assembler to detect whether the actuator is correctly positioned, prior to its rotation phase. In other words, the locator 500 is arranged so that there is only a single positioning of the actuator 2 in relation to the housing 4 or support 6. The locator 500 includes at least three separate and complementary sub-locators 501, 502, 503, a first sub-locator 501 also serving as an end-of-travel stop during the rotation phase of the actuator 2, a second sub-locator 502 and a third sub-locator 503. The three sub-locators 501, 502, 503 are positioned so as to form an arc of circle, the center of this arc of circle being located by the axis of rotation D of the flange 20 of the actuator 2, this arc of circle arrangement limiting the placement of the actuator 2 in relation to the housing 4 or support 6 to a single position. More precisely, the first sub-locator 501 is substantially diametrically opposite the third sub-locator 503 in relation to the axis D. The second sub-locator 502 is situated so that the locator 500 forms a half-circle with an axis D. The holding element 462 and the guide element 460 act as the third sub-locator 503. The three sub-locators are complementary since the absence of one of these three sub-locators makes it possible to choose between at least two different mounting positions. Each of these sub-locators is mounted on the connecting surface 48 of the housing 4 and extends perpendicularly to this connecting surface 48.

Figure 19:
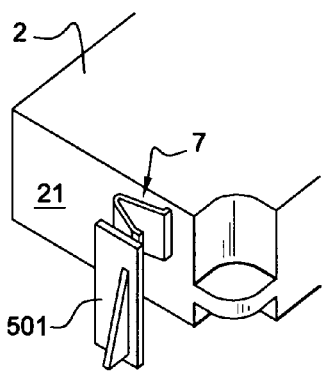
FIGS. 19 and 20 show a first stabilizing means.
Figure 20:
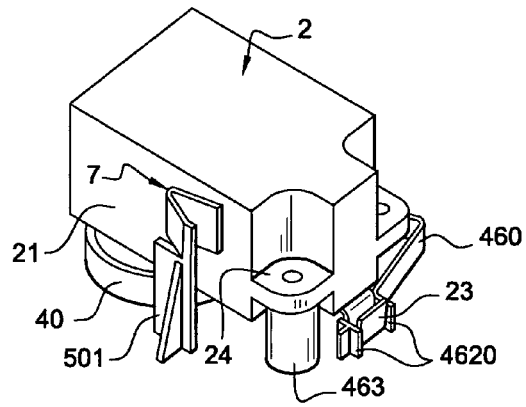
Figure 21:
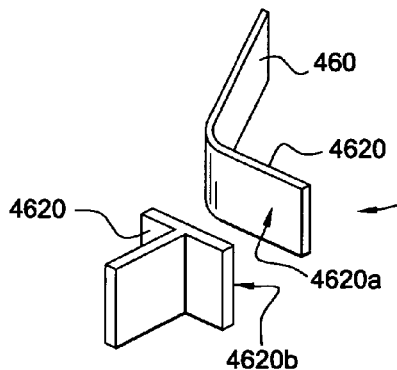
FIG. 21 shows a holding mechanism.

As shown in FIGS. 19 and 20, the fastening device further includes a first stabilizing means 7 in the form of an elastic tab. This first stabilizing means 7 is located between a side 21 of the actuator 2 and the first sub-locator 501 of the locator 500. This first stabilizing means 7 makes it possible to hold the latching tab 23 pressed against one of the clipping walls 4620 forming the holding mechanism, when the actuator 2 is in its final position of use, i.e., its stop position. More precisely, the clipping walls 4620 of the holding element 462, which are spaced apart from each other, each comprise one face 4620a, 4620b (FIG. 21). These two faces are opposite each other, as shown in FIGS. 3 and 4. The face 4620a is that of the clipping wall connected to the guide means 460. The first stabilizing means 7 makes it possible to hold the latching tab 23 pressed against the face 4620a of the clipping wall 4620 connected to the guide means 460. By reason of its elastic properties, the first stabilizing means 7 make it possible to prevent the displacement of this actuator 2. This first stabilizing means 7 also exerts force against the actuator 2 so that the latching tab 23 pressing against the face 4620a of the clipping wall is subjected to a force consisting of a rotational movement opposite that of the assembly operation. This first stabilizing means 7 can be integral with the actuator 2 on one side 21 (FIG. 19) or integral with the first sub-locator 501 (FIG. 20). Finally, the fastening device 1 can include a plurality of first stabilizing means 7.

Figure 22:
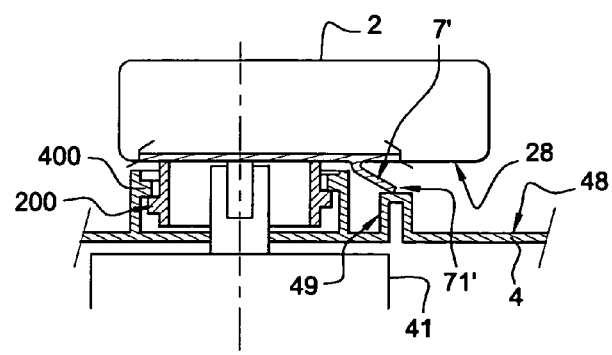
FIG. 22 shows a second stabilizing means.
Figure 23:
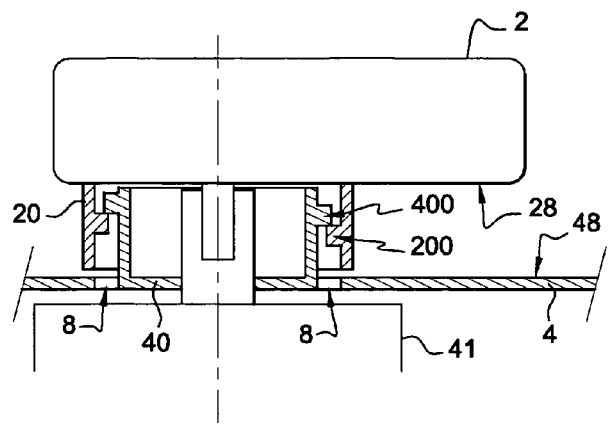
FIGS. 23 and 24 show a housing equipped with demolding openings.
Figure 24:
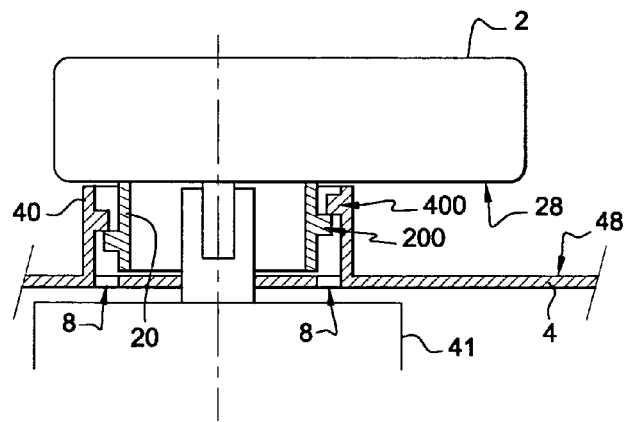

In FIG. 22, a second stabilizing means 7" can also be located between the connecting surface 28 of the actuator 2 and the connecting surface 48 of the housing 4. In this alternative, the second stabilizing means 7' is shaped so as to hold in contact the opposing walls of the respective helical connecting shapes of the actuator 2 and the housing 4. The opposing walls are the respective portions of the screw threads 200 and 400 enabling the actuator 2 to be held axially. The second stabilizing means 7' make it possible to eliminate the axial displacement of the actuator 2 in relation to the housing 4, due to vibrations when the actuator 2 is being used. The elimination of this axial displacement is guaranteed by the elastic properties of the second stabilizing means 7', which make it possible to absorb the vibrations emitted. The second stabilizing means 7' is located between the connecting surface 28 of the actuator 2 and the connecting surface 48 of the housing 4, and can be integral with the connecting surface 28 of the actuator 2 or with the connecting surface 48 supporting the connecting flange 40. In the case where the second stabilizing means 7' is integral with the connecting surface 28 of the actuator 2, the free end 71' of the second stabilizing means 7' presses against a pin 49 formed on the connecting surface 48 of the housing 4, this pin 49 extending perpendicular to the connecting surface 48. Of course, if the second stabilizing means 7' is situated on the connecting surface 48, the pin 49 is located on the connecting surface 28 of the actuator 2. Furthermore, the second stabilizing means 7' can be used in combination with the first stabilizing means 7. The fastening device 1 can also include a plurality of second stabilizing means 7'.

The description of FIGS. 18 to 40 is based on an embodiment including the connecting surface 48 of the housing 4. However, the invention also includes the same embodiments made with the connecting surface 68 of the support 6.

In order to make it easier to unmold the housing 4 during manufacture, it is necessary to provide openings 8 made in the connecting surface 48. These openings 8 are located on the periphery of the flange 40 of the housing 4. Depending on the type of flange 40, i.e., depending on whether this flange 40 is male (FIG. 23) or female (FIG. 24), the openings 8 are located either on the external periphery of the male flange 40, or on the internal periphery of the female flange 40 of the housing 4. More precisely, these openings 8 are distributed, as the case may be, on an external or internal annular band surrounding the flange 40 of the housing 4. Furthermore, the openings 8 are situated at the base of the flange 40, i.e., they are made in the connecting surface 48 closest to the flange 40. A single opening suffices for demolding the housing 4. However, a plurality of openings 8 is more advantageous from the viewpoint of the ease with which the housing 4 is demolded. The openings 8 have the disadvantage of causing air leaks. In order to remedy that, the flange 20 of the actuator 2 is shaped so as to obstruct at least one opening 8 in the connecting surface 48 supporting the mating flange 40, the opening 8 being made on the periphery, on the interior or exterior side of said mating flange 40. More precisely, once the actuator 2 is fastened onto the housing 4, i.e., when the actuator 2 is in its working position, the openings 8 of the connecting surface 48 are located between flange 20 and flange 40. Whichever situation is anticipated, i.e., whether flange 40 is male or female, flange 20 is shaped so that the openings 8 are located between the two flanges 20 and 40 and are situated opposite the screw threads 200, 400 of the connecting shapes of the flanges 20, 40. In this way, air leaks are prevented by means of the respective connecting shapes of the flanges 20, 40, which function as a sealing joint when they cooperate with each other in order to fasten the actuator 2 to the housing 4.

Figure 25:
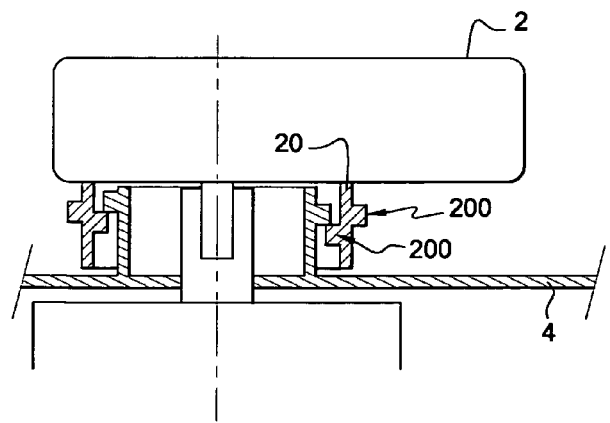
FIGS. 25 and 26 show a connecting flange equipped with several helical connecting shapes.
Figure 26:
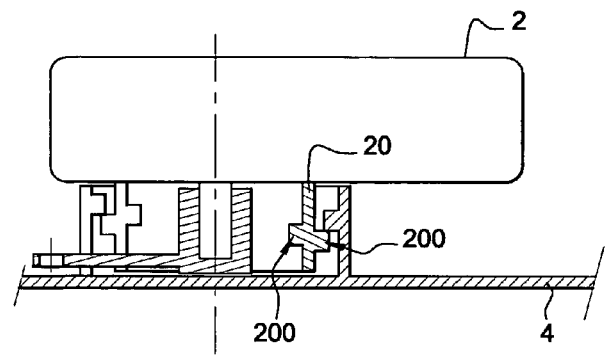

In order to reduce production costs, in FIGS. 25 and 26, the flange 20 of the actuator 2 is shaped so as to be capable of being used either as a male flange or as a female flange. Thus, a single actuator 2 alone can be produced for two different situations (male or female flange). The flange 20 of the actuator 2 thus includes helical connecting shapes 200 on the internal face and the external face of its wall. The connecting shape is the same, whether it is on the internal face or on the external face of the wall of the flange 20, and corresponds to the helical connecting shapes 200 described previously. In FIG. 25, the flange 20 of the actuator 2 is used as a female flange. In FIG. 26, the flange 20 is used as the male flange.

Figure 27:
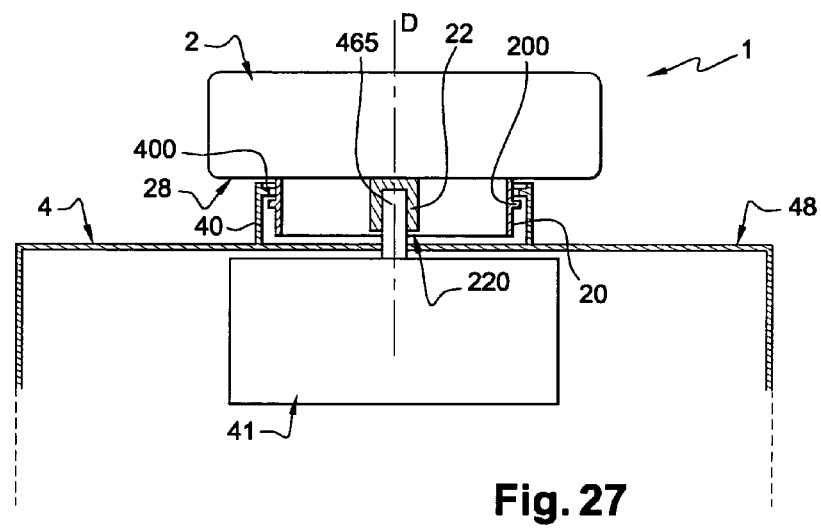
FIGS. 27, 28 and 29 show the invention with a female drive shaft.

In FIG. 27, according to another embodiment of the invention shown, the actuator 2 comprises a drive shaft 22 with its free end 220 being of the female type, and the movable member 41 comprises a connecting bearing 465 with its free end being of the male type, this end cooperating with the free end 220 of the actuator 2. Several alternatives exist for this embodiment.

The first alternative corresponds to the case where the drive shaft 22 and the connecting bearing 465 are coaxial in relation to the axis D. This first alternative is shown in FIG. 27.

According to one alternative already shown in FIGS. 6 and 8, the connecting bearing 465 of the movable member 41 and the drive shaft 22 of the actuator are off-center in relation to the axis of the connecting flanges 20 and 40. According to this alternative, it is possible to anticipate two sub-alternatives.

Figure 28:
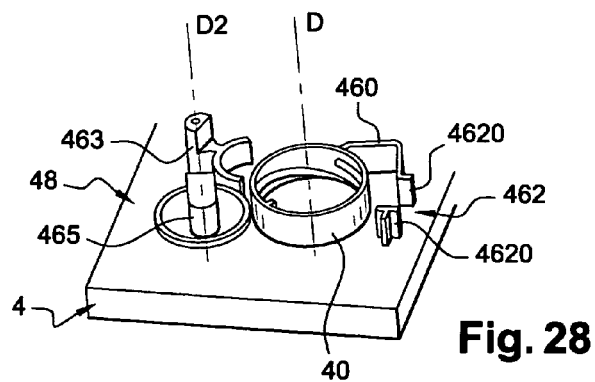
Figure 29:
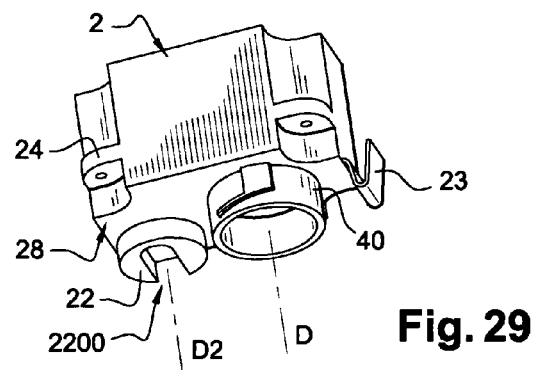

For the first sub-alternative, as shown in FIGS. 28 and 29, the connecting bearing 465 and the drive shaft 22 are coaxial in relation to the axis D2. When the drive shaft 22 of the actuator 2 and the connecting bearing 465 of the movable member 41 are off-center in relation to the axis D of the flanges and coaxial in relation to the axis D2, the drive shaft 22 has a notch 2200 shaped so as to nest radially inside the connecting bearing 465 of the movable member 41 via the notch 2200, when the actuator 2 reaches its stop position. This notch 2200 is shaped in the same way as the notch 4650 shown in FIG. 6.

Figure 30:
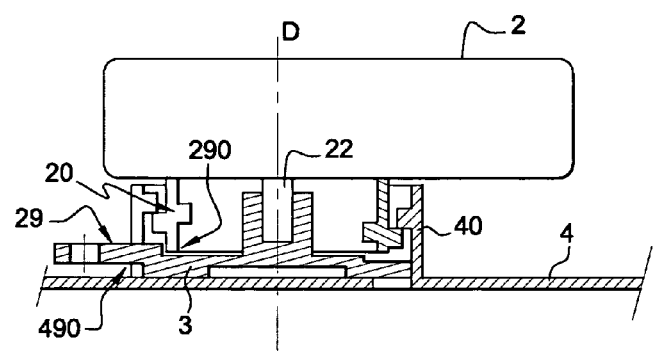
FIG. 30 shows another embodiment of the invention.

In the second sub-alternative, as shown in FIG. 30, the connecting bearing 465 of the movable member 41 is off-center in relation to the drive shaft 22 of the actuator 2 so that the drive shaft 22 of the actuator 2 is connected to the connecting bearing 465 of the movable member 41 via a drive mechanism 3. This drive mechanism 3 corresponds to the one described in FIG. 9. The drive shaft 22 of the actuator 2 is coaxial with the connecting flanges 20 and 40. For this reason, the flange 20 of the actuator 2 and the flange 40 of the housing 4 each have a notch 290, 490 on their wall shaped so as to allow the first lever 29 to pass through the flanges 20, 40. The lever 29 is preferably shaped so as to obstruct one or more openings 8 made on the periphery and on the interior side of the connecting flange located on the connecting surface 48 of the housing 4. This makes it possible to prevent any air leak due to the openings 8. It is also possible for the flange 20 of the actuator 2 to have a shorter dimension than the flange 40. In this way, the notch 290 of the flange 20 is no longer required in order for the first lever 29 to pass. By "shorter dimension", it is understood that the flange 20 has a height between the connecting surface 28 of the actuator 2 and the connecting surface 48 that is shorter than that of the flange 40.

Figure 31:
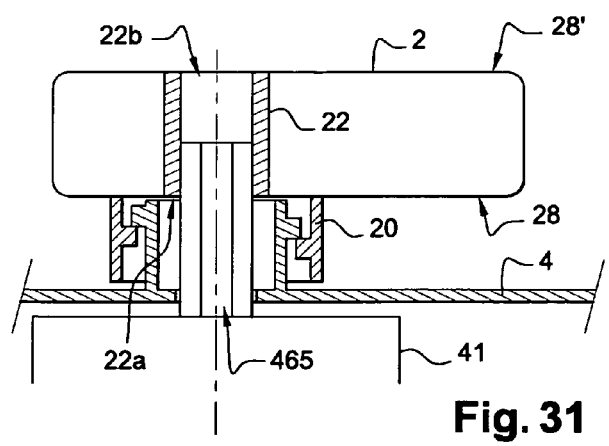
FIGS. 31 to 40 show an embodiment with an actuator comprising a double-ended drive shaft.
Figure 32:
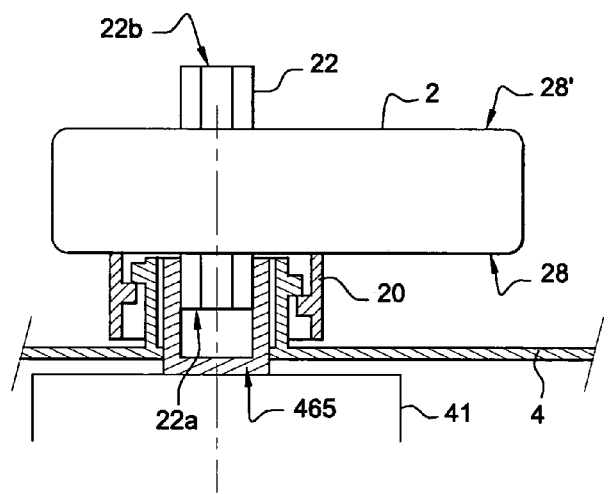
Figure 34:
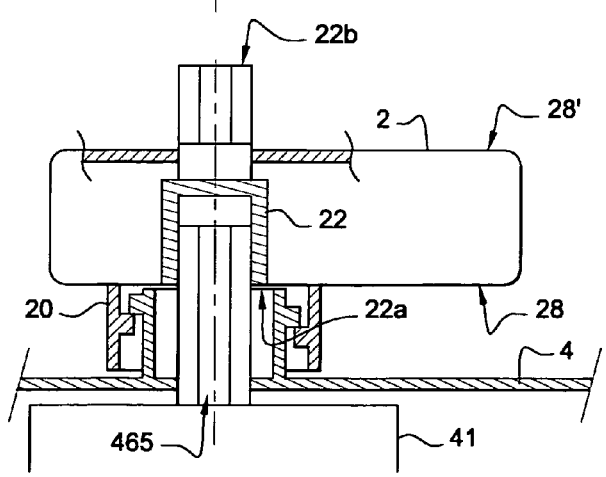

Another embodiment is shown in FIGS. 31 and 34, wherein the actuator 2 includes a two-ended drive shaft 22 whose first end 22a is located on the same side as the connecting flange 20 and a second end 22b is located on the side opposite the connecting flange 20, in relation to the body of the actuator 2. A double-ended actuator such as this makes it possible to control two separate movable members 41 distant from each other. The double-ended structure of the actuator 2 includes a first opening on the connecting surface 28 of the actuator 2, in which a first end 22a of the drive shaft 22 is housed. The actuator 2 includes a second opening located in the face 28' opposite the connecting surface 28, in relation to the body of the actuator 2, in which the second end 22b of the drive shaft 22 is housed. The first opening and the second opening are coaxial.

Figure 33:
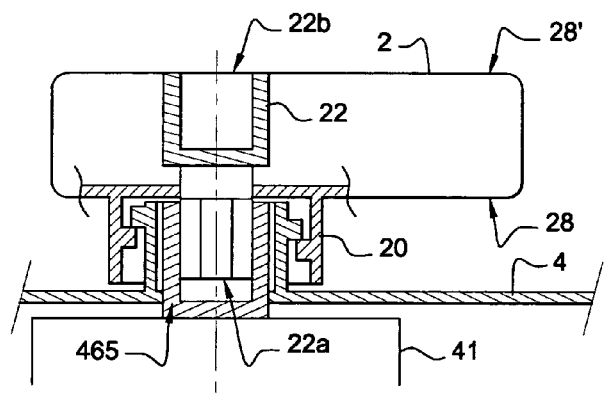

Furthermore, each of the ends 22a, 22b can be of two different shapes: male or female. Thus, the drive shaft 22 can have two female-type ends (FIG. 31) or two male-type ends (FIG. 32) or one male end and one female end (FIGS. 33 and 34). Of course, the end of the connecting bearing 465 of the movable member 41 will be of the male or the female type so as to cooperate with the associated end 22a, 22b of the drive shaft 22.

When one end 22a, 22b is of the male type, the end 22a 22b of the drive shaft 22 protrudes from the respective face 28, 28' of the actuator 2. When one end 22a, 22b is of the female type, the concerned end of the drive shaft 22 does not protrude from the corresponding face 28, 28' of the actuator 2.

FIGS. 31 to 34 show the various possible configurations of the two ends 22a, 22b. In these configurations, the drive shaft 22 is coaxial with the connecting bearing 465 of the movable member 41.

Figure 35:
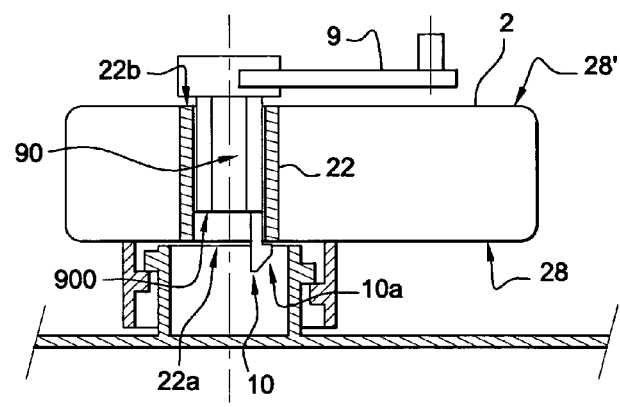

Furthermore, an embodiment is shown in FIG. 35 wherein the two ends 22a and 22b are of the female type. When the drive shaft 22 comprises two ends 22a, 22b of the female type, it is hollow. The fact that the drive shaft 22 is hollow makes it possible, for example, for a male-type connecting bearing to be inserted via end 22b and to protrude from end 22a. According to FIG. 35, only end 22b is used. In this case, the movable member 41, not shown, is distant from the actuator 2 so that its connecting bearing 465, not shown, is off-center from the drive shaft 22 of the actuator 2. An indirect drive mechanism 9 joins the end 22b of the drive shaft 22 to the connecting bearing 465 of the movable member 41. The indirect drive mechanism 9 includes a drive shaft 90 cooperating with drive shaft 22. The end 22b being of the female type, the drive shaft 90 is shaped so as to be of the male type. The male end 900 of the drive shaft 90 comprises a linking means 10 making it possible to fasten the indirect drive mechanism 9 to the drive shaft 22 of the actuator 2. This linking means 10 enables an axial hold of the drive shaft 90 of the indirect drive mechanism 9. This linking means 10 can be in the form of a tongue. For example, the tongue, protruding from the first end 22a, is clipped on to the end 22a so as to press against an edge of this end 22a. This tongue comprises two ends, one of which is fastened to or made in one piece together with the male end 900 of the drive shaft 90 of the drive mechanism 9. The other end of the tongue comprises a protuberance 10a that presses against the end 22a of the drive shaft 22 of the actuator 2. This protuberance 10a protrudes from the end 22a and from the connecting surface 28. This protuberance 10a enables an axial hold of the drive shaft 90 in relation to the drive shaft 22 and thereby prevents axial displacement of the indirect drive mechanism 9. This clipping means 10 consisting of a tongue is an inexpensive means of connecting the indirect drive mechanism 9 together with the actuator 2.

Figure 36:
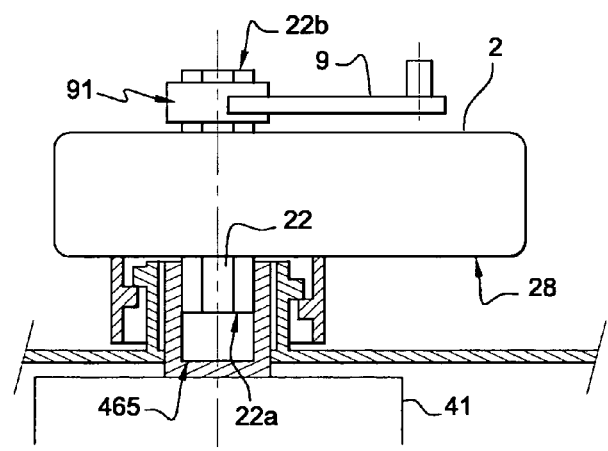
Figure 37:
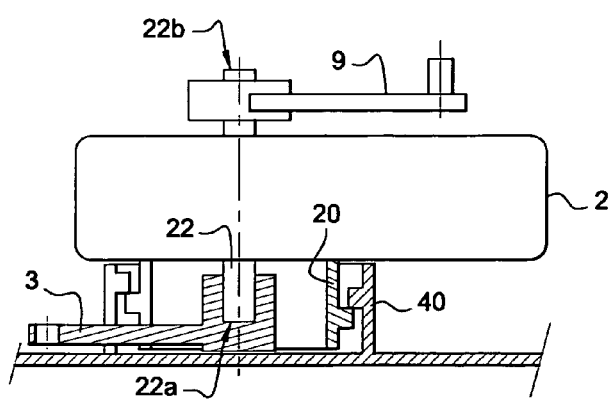

FIGS. 36 and 37 show the embodiments wherein the two ends 22a and 22b are of the male type and are both used, i.e., the drive shaft 22 of the actuator 2 simultaneously drives either two indirect drive mechanisms 3, 9, or one indirect drive mechanism 9 and one movable member 41. In these cases, the indirect drive mechanism 9 comprises a linking means 91 of the female type, cooperating with the second end 22b of the drive shaft 22 of the actuator 2 in order to connect the drive shaft 22 to the movable member, not shown, via the indirect drive mechanism 9.

In FIG. 36, the connecting bearing 465 of the movable member 41 is coaxial with the drive shaft 22 of the actuator 2. The female-type bearing cooperates with the first end 22a. This embodiment makes it possible to simultaneously control two separate and distant movable members with a single actuator.

In FIG. 37, the embodiment shows the case in which the two movable members, not shown, simultaneously controlled by the same actuator 2, are distant from each other and are both off-center in relation to the actuator 2. For this reason, at the first end 22a, an indirect drive mechanism 3 connects the connecting bearing 465 of the movable member 41 to the drive shaft 22 of the actuator 2. As in the preceding examples, the flanges 20 and 40 each have a notch for operating this indirect drive mechanism 3.

Figure 38:
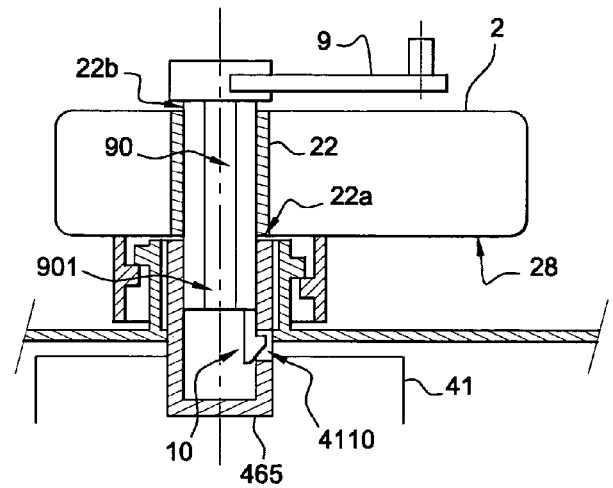
Figure 39:
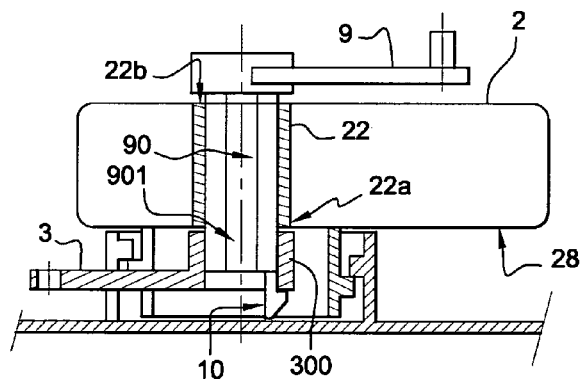

In FIGS. 38 and 39, the first end 22a and the second end 22b are of the female type and both are used, and clipping means 10 of the indirect drive mechanism 9 protrude from the first end 22a so as to cooperate with the other element rotated by the drive shaft 22.

In FIG. 38, the connecting bearing 465 of the movable member 41 is of the female type so as to cooperate with the drive shaft 90 of the indirect drive mechanism 9. This connecting bearing 465 is coaxial with drive shaft 90 and drive shaft 22. Furthermore, the fastening of the connecting bearing 465 of the movable member 41 to the actuator 2 is enabled by the portion 901 of the drive shaft 90 of the indirect drive mechanism 9 that protrudes from the connecting surface 28 and the linking means 10. More precisely, the protruding portion 901 of the drive shaft 90 of the indirect drive mechanism 9 is the portion of the drive shaft 90 protruding from the connecting surface 28, and cooperates with the connecting bearing 465 of the movable member 41. The linking means 10 clip into a hole 4410 of the internal wall of the connecting bearing 465. In this way, the indirect drive mechanism 9 and the movable member 41 are held axially in relation to each other.

In FIG. 39, the actuator 2 simultaneously controls two separate movable members, not shown, and both are off-center from the drive shaft 22 of the actuator 2. The drive shaft 90 of the indirect drive mechanism 9 protrudes from the connecting face 28. At its protruding portion 901, this drive shaft 90 comprises the linking means 10. The protruding portion 901 as well as the linking means 10 cooperate with an indirect drive mechanism 3. More precisely, the indirect drive mechanism comprises a female portion 300 fitting onto the protruding portion 901 of the drive shaft 22, and the linking mechanism 10 clips on to the female portion 300 of the indirect drive mechanism 3. In this way, the indirect drive mechanism 3 and the indirect drive mechanism 9 are integral with each other and are held axially in relation to each other.

By "one end 22a, 22b is used", it is understood that an element such as a connecting bearing of a movable member or an indirect drive mechanism cooperates with the drive shaft 22 of the actuator 2 by means of this end 22a, 22b.

Figure 40:
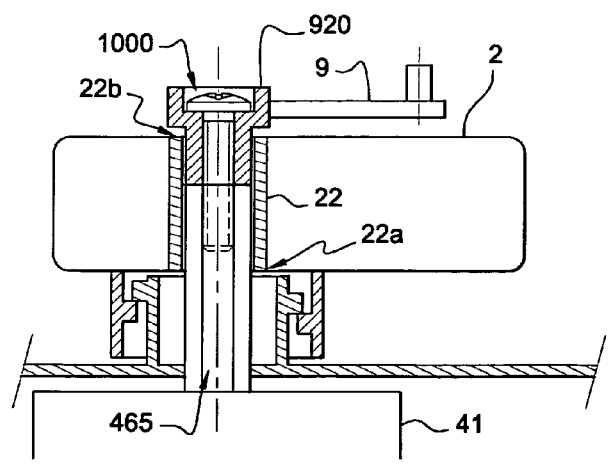

Another form of the linking means 10 of the indirect drive mechanism 9 is shown in FIG. 40. In this embodiment, the drive shaft 22 of the actuator 2 has two female-type ends 22a, 22b. Thus, the male-type connecting bearing 465 of the movable member 41 is inserted into the drive shaft 22 via the end 22a. The connecting bearing 465 does not pass through the hollow drive shaft 22 entirely and therefore does not protrude from the end 22b. At its end, the indirect drive mechanism 9 comprises a member that is inserted into the drive shaft 22 via the end 22b. This element 920 is hollow and shaped so as to be capable of housing a screw 1000 inside of its cylindrical wall. This screw 1000 makes it possible to firmly fasten the member 920 of the indirect drive mechanism 9 together with the connecting bearing 465 of the movable member 41.

The invention is not limited to the embodiments described above. In particular, it encompasses any type of drive link between the actuator and the movable member. Thus, in place of a drive shaft 22 extending from the connecting surface 28 of the actuator, the actuator can alternatively comprise a spindle whose wall is perforated in order to receive the rotating shaft of the movable member 41, in the case of a direct drive, or the lever 29, in the case of an indirect drive.

In the fastening device of the invention, the fastening means are provided on the exterior of the housing, and do not involve a through-opening. Furthermore, the seal is ensured by the bearing 465 of the movable member 41. Consequently, contrary to the embodiments of the prior art, the fastening device of the invention does not have any problems relating to sealing, or to the overall dimensions of the interior volume of the housing.

The means of fastening the actuator to the housing also guarantee an effective axial and radial hold without giving rise to complicated molding constraints. They therefore offer a high degree of mechanical strength.

Furthermore, as the axis of the damper is in direct contact with the bearing 465, it is possible to integrate, with the housing mechanical end-of-travel stops for the damper, as well as to guide the damper very close to the axis of the damper 41.

Additionally, the housing-actuator assembly of the invention enables easy molding of the fastening means on the housing 4 and on the actuator 2. It is no longer necessary to use stripping dies.

The fastening device of the invention also permits the drive link mechanism, e.g., a lever, to be fastened to the exterior of the housing, in the case of indirect driving of the movable member 41.

The rotational movement used for assembling the actuator 2 to the housing 4 can be of low amplitude, which is particularly useful when several actuators are installed on the housing. This also leads to the possibility of installing two actuators on the housing in close proximity to each other.

In this way, therefore, the invention offers flexibility in the installation of actuators on the housing, which is particularly useful in motor vehicles.

In the applications related to a heating and air conditioning device, the invention further makes it possible to use several actuators fastened onto the same housing by means of the fastening device of the invention. In these applications, it can be particularly advantageous to arrange the actuators on the housing so that they all have the same direction of rotation.

The invention claimed is:

1. A device for an actuator (2) with a housing (4), in particular for a motor vehicle, the actuator (2) being designed to drive a movable member (41) arranged inside the housing (4), the device comprising fastening means for making the actuator (2) integral with the housing (4), characterized in that a support (6) is placed between the actuator (2) and the housing (4), the fastening means include two mating connecting flanges (20, 40) mounted, respectively, on a connecting surface (28) of the actuator (2) and on a connecting surface (68) of the support (6), and in that the connecting flanges (20, 40) are configured to be assembled via a male/female-type connection on an exterior of the housing (4), wherein the fastening means further includes a stop device (462, 23) configured to block rotation of the actuator (2) in relation to the housing (4) or the support (6) in a stop position, wherein the stop device includes a latching tab (23) arranged on the actuator (2) and a holding mechanism (462) arranged on the connecting surface (68) of the support (6), the tab being designed to be fastened to the holding mechanism (462) by clipping on, when the actuator (2) reaches the stop position, and wherein the holding mechanism (462) comprises a guide element (460) and holding elements (462).

2. The device of claim 1, characterized in that the connecting flanges (20, 40) are shaped so that the actuator (2) is connected to the support (6) by a translational movement, in the direction of the drive shaft, towards the interior of the housing, followed by a rotational movement, until the stop position is reached.

3. The device of claim 2, characterized in that the connecting flanges (20, 40) are shaped so as to produce a translational movement towards the housing (4) during the rotational movement of the actuator (2).

4. The device of claim 1, characterized in that the connecting flanges (20, 40) have mating helical connecting shapes on at least a portion of their wall, and in that the male connecting flange shapes (20) comprise discontinuous helical grooves (200).

5. The device of claim 1, wherein the guide element being shaped so as to bring the latching tab (23) substantially opposite the holding element (462) during the rotating movement of the actuator (2), and the holding elements (462) being shaped so as to connect by clipping together with the latching tab (23), when the actuator (2) reaches its stop position.

6. The device of claim 5, characterized in that the latching tab (23) comprises an elastic portion, and in that the guide element (460) is shaped so as to exert increasing stress on the latching tab (23) during the rotating movement of the actuator (2), the elastic portion of the latching tab relaxing when the tab arrives substantially opposite the holding elements (462).

7. The device of claim 1, characterized in that the latching tab (23) extends in an overall plane that is substantially perpendicular to the connecting surface (28) on which it is arranged.

8. The device of claim 1, characterized in that the stop device includes a holding stud (463) arranged on the support (6), and in that the actuator (2) is designed to be screwed onto the holding stud, after assembly of the actuator (2) and the housing (4).

* * * * *